United States Patent [19]
Zweigle et al.

[11] 4,098,977

[45] * Jul. 4, 1978

[54] METHOD FOR PREPARING POLYMERS FROM WATER SOLUBLE VINYL MONOMERS

[75] Inventors: Maurice L. Zweigle; Samuel J. Kasley, both of Midland, Mich.

[73] Assignee: The Dow Chemical Company, Midland, Mich.

[ * ] Notice: The portion of the term of this patent subsequent to Apr. 26, 1994, has been disclaimed.

[21] Appl. No.: 762,593

[22] Filed: Jan. 26, 1977

Related U.S. Application Data

[63] Continuation-in-part of Ser. No. 593,157, Jul. 3, 1975, Pat. No. 4,020,256.

[51] Int. Cl.² .............................. C08F 2/16; C08F 2/10; C08F 2/32; C08F 4/40

[52] U.S. Cl. ....................................... 526/77; 526/62; 526/88; 526/227; 526/230; 526/234; 526/303

[58] Field of Search ................... 526/77, 88, 227, 230, 526/234, 303

[56] References Cited

U.S. PATENT DOCUMENTS

| | | | |
|---|---|---|---|
| 3,644,305 | 2/1972 | Frisque et al. | 526/88 |
| 4,020,256 | 4/1977 | Zweigle et al. | 526/88 |

*Primary Examiner*—Alan Holler

[57] ABSTRACT

A concentrated solution of a water-soluble vinyl monomer is mixed at or below room temperature with an effective amount of a peroxygen catalyst and the resulting solution is freed of inhibitory oxygen and thereafter atomized into a reaction vessel containing an atmosphere of gaseous sulfur dioxide to produce a polymer product by redox catalysis.

5 Claims, No Drawings

METHOD FOR PREPARING POLYMERS FROM WATER SOLUBLE VINYL MONOMERS

CROSS-REFERENCE TO RELATED APPLICATION

This application is a continuation-in-part of our copending application Ser. No. 593,157, filed July 3, 1975, now U.S. Pat. No. 4,020,256.

BACKGROUND OF THE INVENTION

It has recently been suggested in U.S. Pat. No. 3,644,305 to carry out the polymerization of acrylamide and the like by spraying an aqueous solution of the monomer with an appropriate catalyst into a blast of hot air in a spray dryer apparatus. A principal object of the foregoing process is to obtain the polymer product in the form of a substantially dry solid and thereby to avoid the substantial problems encountered in drying the thick viscous gels normally obtained in the conventional process of polymerizing water-soluble monomers in aqueous solution. It will be noted however that the above process has the drawback that relatively high proportions of peroxide catalyst must be employed in order to accomplish conversion of the monomer to polymer. The process also employs elevated temperatures for its purposes and any unreacted monomer may constitute a hazard in the vent gas.

SUMMARY OF THE INVENTION

The present invention embodies a novel process for controlled rapid polymerization of water-soluble vinyl monomers. In accordance with the invention a concentrated aqueous solution comprising as a solute one or more water-soluble vinyl monomers and a peroxygen catalyst is prepared at or below room temperature, the resulting solution is freed of inhibitory oxygen and is thereupon sprayed into an oxygen-free atmosphere comprising sulfur dioxide gas. The peroxygen catalyst and sulfur dioxide are present in amounts effective to polymerize the monomer. The polymerization reaction is initiated when the atomized deoxygenated monomer solution is contacted with the sulfur dioxide gas even at room temperature and proceeds rapidly as an exothermic reaction. For the purposes of this invention, it is understood that the aqueous solution of monomer and peroxygen catalyst may be dispersed in an oil phase in which the monomer is insoluble. The resulting water-in-oil emulsion is then subjected to polymerization conditions. For purposes of brevity, the terminology "aqueous solution" as used herein including the claims shall include both aqueous solutions and water-in-oil emulsions thereof.

DETAILED DESCRIPTION OF ILLUSTRATIVE EMBODIMENTS

The reaction is particularly applicable for the preparation of polymers of acrylamide, methacrylamide and other α-monoethylenically unsaturated amides, especially the acrylamide homopolymers and copolymers of acrylamide with other water-soluble vinyl monomers. Additional water-soluble monomers which may be suitably homopolymerized or copolymerized with one or more of the aforementioned amides include hydroxyalkyl esters of ethylenically unsaturated carboxylic acids such as the hydroxyethyl and hydroxypropyl esters of acrylic and methacrylic acid; sulfoalkyl esters of ethylenically unsaturated carboxylic acids such as 2-sulfoethyl methacrylate; ethylenically unsaturated carboxylic acids such as acrylic acid and methacrylic acid including the water-soluble salts thereof such as sodium acrylate and ammonium acrylate; N-amino ethylenically unsaturated amides such as N-(dimethylaminomethyl)acrylamide; aminoalkyl esters of ethylenically unsaturated carboxylic acids such as aminoethyl methacrylate and aminoethyl acrylate; vinylbenzyl sulfonic acid; vinyl benzylammonium salts; ethylenically unsaturated nitriles such as acrylonitrile and fumaronitrile; and other similar water-soluble, ethylenically unsaturated monomers.

It is further understood that rather small proportions, i.e., up to about 15 weight percent based on total monomer weight of water-insoluble monomers which are copolymerizable with the water-soluble monomer(s) are optionally employed. Examples of such water-insoluble monomers include alkyl esters of ethylenically unsaturated carboxylic acids such as ethyl acrylate; vinyl and vinylidene halides such as vinyl chloride and vinylidene chloride; monovinylidene aromatics such as styrene; vinylalkyl ethers; and the like. When such water-insoluble monomers are employed, it is desirable to use a surfactant or a water-miscible cosolvent to aid in dispersing these monomers in the aqueous phase.

In carrying out the reaction it is preferred to employ a concentrated solution of the water-soluble vinyl monomer. The absolute concentration will of course be limited by the solubility of the particular monomer or monomers employed. With highly soluble monomers such as acrylamide good results are obtained when employing from about 30 percent to about 60 percent by weight of the monomer. Such solutions may also contain various modifiers and additaments such as buffers to maintain the pH in a desirable range or chelating agents to prevent interference by metal ion contaminants. Thus, for example, when operating with acrylamide it is convenient to employ sodium acetate in the starting solution as a buffer and to employ a tetraacetic acid derivative of ethylene diamine or a polyacetic acid derivative of a polyalkylene polyamine as a chelating agent to inactivate interfering metals such as copper.

To achieve the purposes of the invention it is essential that the monomer solution after being fully prepared should be substantially freed of inhibitory oxygen before introduction into the reaction chamber. Thus for example the solution of vinyl monomer and peroxygen catalyst together with any additaments such as buffers or chelating agents may be prepared in a solution somewhat more dilute than desired for the final polymerization reaction and thereafter have excess water removed by boiling under reduced pressure whereby any dissolved oxygen will be removed with the water vapor exiting from the system. In a preferred method of operation the solution is prepared and is thereafter sparged with a current of an inert gas such as nitrogen, helium or argon until substantially free of oxygen. Depending upon the volume of solution employed, sparging with inert gas should be continued for from about 10 minutes to 30 minutes or more to assure removal of inhibitory oxygen. In any case, after the peroxygen catalyst is added to the monomer solution it is essential that the solution be maintained at a temperature below the thermal activation temperature of the particular peroxygen catalyst employed. Preferably the temperature of the solution is maintained at 25° C or less until the solution is employed for the polymerization reaction.

Any suitable apparatus may be employed for contacting the monomer solution with the sulfur dioxide gas to initiate the polymerization reaction provided that the reaction is carried out in the substantial absence of oxygen. For example, the monomer solution may be sprayed into a cylindrical vessel near the top thereof and allowed to descend countercurrently in droplet form under the force of gravity through an upwardly flowing stream of sulfur dioxide gas or a mixture of sulfur dioxide with an inert gas introduced at the bottom of the vessel. Alternatively the solution and a stream of sulfur dioxide gas can be introduced concurrently into a reaction vessel with provision for turbulent mixing of the gas with the atomized solution. In either case, provision is made for separating the polymer product from excess sulfur dioxide. The latter can then be recycled in the process with an intervening drying step if needed. In a further mode of operation the reaction is carried out batchwise in a sealed chemical kettle or pressure vessel wherein an atmosphere of sulfur dioxide gas is maintained at somewhat below normal atmospheric pressure and the monomer solution is sprayed into and through the gas to bring about the polymerization reaction. In general it is desirable that the piping and reaction vessel be constructed of stainless steel or be lined with glass or inert plastic in order to avoid contaminating the monomer solution with metallic ions which may alter or inhibit the polymerization.

The peroxygen catalyst may be any of the various inorganic peroxy compounds or organic hydroperoxide compounds known to be active in producing free radicals to initiate vinyl polymerization provided that said compounds are soluble in the aqueous solution of vinyl monomer and are capable of reacting with sulfites in a redox chain reaction mechanism. Illustrative of such peroxygen catalysts are the ammonium and alkali metal persulfates, perborates and percarbonates; tertiary alkyl hydroperoxides, such as tertiary butyl hydroperoxide, hydrogen peroxide, peracids, peresters; and the like. The concentration of peroxygen catalyst is desirably an amount which is sufficient in the presence of the sulfur dioxide to catalyze polymerization of the vinyl monomer by redox catalysis. Advantageously, the peroxygen catalyst is employed in the amount of from about 50 to about 2000 parts, preferably from about 100 to 1100 parts, by weight of peroxygen compound per million parts of the vinyl monomer in the solution. In cases wherein a somewhat lower molecular weight polymer, e.g., a Mw of a million or less, is desired, the peroxygen compound is advantageously employed at concentration in the range from about 800 to about 1100 weight parts per million weight parts of vinyl monomer.

The polymerization reaction is initiated and proceeds rapidly when fine droplets of the prepared aqueous monomer solution are contacted with the sulfur dioxide gas at ambient temperature. The redox reaction may be initiated at temperatures as low as 0° C, and however, in order to obtain a desirably rapid rate of polymerization it is generally preferred to initiate the reaction at a temperature in the range of from about 15° C to about 30° C. The reaction is exothermic and in one preferred mode of operation the spray of fine droplets of monomer solution and the sulfur dioxide gas are passed concurrently through an adiabatic reaction zone whereby the heat of polymerization is utilized to raise the temperature of the reaction zone to assure completion of the reaction and simultaneously to evaporate water from the polymer product which is thereafter collected as a dry powder in a centrifugal separator. In some cases it may be desirable to supply heat to the reaction zone so that the reaction mixture reaches a final temperature of from about 60° C to 80° C to assure completion of the polymerization reaction. Also, in some cases it may be desirable to recover the polymer as an aqueous solution thereof or in the form of a water-in-oil emulsion.

In a representative operation, a 300 gallon pressure vessel was evacuated and refilled with nitrogen. The evacuation and refilling with nitrogen was repeated three more times to assure the substantial removal of oxygen from the atmosphere in the kettle. The kettle was evacuated once more and this time the vacuum was partially relieved with sulfur dioxide gas so that the vessel contained an atmosphere which consisted predominantly of sulfur dioxide and which was at a pressure somewhat below the ambient external pressure. About ten gallons of monomer solution was prepared in deionized water to contain in each 100 parts by weight of solution: 50 parts of acrylamide, 2.5 parts of sodium acetate, 0.05 part of pentasodium salt of (carboxymethylimino)bis(ethylenenitrilo)tetraacetic acid (Versenex 80) and 0.005 part of tertiary butyl hydroperoxide, all parts being by weight. This solution was purged to remove dissolved oxygen therefrom by passing a current of fine bubbles of nitrogen therethrough for a period of ten minutes. The monomer solution was thereafter maintained under a blanket of nitrogen and was introduced rapidly through a spray header into the kettle containing the sulfur dioxide gas. Polymerization was initiated when the sprayed solution contacted the sulfur dioxide gas and the product was collected in a layer of water in the bottom of the reactor and drawn off as an aqueous solution of the polymer product. Alternatively, an oil layer may be substituted for the water layer in which case the polymer is recovered as a water-in-oil emulsion. Analysis of the product showed 89 percent conversion of monomer to polymer.

In a further operation carried out exactly in accordance with the foregoing procedure except that the nitrogen purge time was reduced to only five minutes, only 50 percent conversion of the monomer to polymer was obtained.

More complete reactions, with monomer conversion of over 99 percent, are obtained by employing a reaction vessel designed to provide a longer residence time for reaction or by employing an adiabatic reactor or supplying heat to a portion of the reaction zone to raise the temperature during the later stages of the polymerization reaction. Higher molecular weight polymers are obtained by reducing the partial pressure of sulfur dioxide in the reaction zone. The reaction can be initiated with as little as about 1 percent by volume of sulfur dioxide in the gas phase in the reaction zone, since it is only necessary that a catalytic amount of sulfur dioxide contacts the droplets of monomer solution. Any suitable inert diluent gas such as nitrogen, argon or the like can be employed to lower the concentration of sulfur dioxide, provided that said diluent gas contains no free oxygen.

We claim:

1. A method for preparing a polymer from a water-soluble vinyl monomer which comprises forming a concentrated aqueous solution of said monomer containing a peroxygen catalyst, purging said solution until substantially free of inhibitory oxygen and spraying the purged solution at a temperature of from about 15° to about 30° C into an atmosphere substantially free of oxygen and containing sulfur dioxide gas, said peroxygen catalyst and sulfur dioxide being present in amounts effective to catalyze polymerization of the vinyl monomer.

2. A method according to claim 1 wherein the monomer is acrylamide.

3. A method according to claim 2 wherein the monomer is employed in a concentration of from about 30 to about 60 percent by weight.

4. A method according to claim 1 wherein the monomer solution in droplet form is passed countercurrently through the atmosphere containing sulfur dioxide gas.

5. A method according to claim 3 wherein the monomer solution contains from about 100 to 1100 parts by weight of tertiary butyl hydroperoxide per million parts of acrylamide and the atmosphere contains at least about 1 percent by volume of sulfur dioxide.

* * * * *